United States Patent [19]

Widener

[11] Patent Number: 4,668,469
[45] Date of Patent: May 26, 1987

[54] FASTENER LOCKING DEVICE FOR ATTACHING GUIDE THIMBLE TO FUEL ASSEMBLY BOTTOM NOZZLE

[75] Inventor: Wade H. Widener, Cayce, S.C.

[73] Assignee: Westinghouse Electric Corp., Pittsburgh, Pa.

[21] Appl. No.: 743,193

[22] Filed: Jun. 10, 1985

[51] Int. Cl.$^4$ .............................................. G21C 3/32
[52] U.S. Cl. .................................. 376/446; 376/353; 411/109
[58] Field of Search .............. 376/446, 449, 440, 353, 376/364, 434; 411/178, 124, 127, 109, 148; 285/DIG. 22

[56] References Cited

U.S. PATENT DOCUMENTS

| | | | |
|---|---|---|---|
| 921,691 | 5/1909 | Friday | 285/DIG. 22 |
| 1,814,858 | 7/1931 | Rutter | |
| 2,782,827 | 2/1957 | Rosan | |
| 2,886,090 | 5/1959 | Rosan | 411/103 |
| 3,160,188 | 12/1964 | Frank | 411/103 |
| 3,259,161 | 7/1966 | Rosan | 411/109 |
| 3,828,868 | 8/1974 | Jabsen | 376/449 |
| 4,030,975 | 6/1977 | Anthony et al. | 376/446 |
| 4,208,248 | 6/1980 | Jabsen | 376/449 |
| 4,323,428 | 4/1982 | Schallenberger et al. | 376/353 |
| 4,416,848 | 11/1983 | Feutrel | 376/446 |
| 4,541,658 | 9/1985 | Bartholomew | 285/DIG. 22 |

FOREIGN PATENT DOCUMENTS

| | | | |
|---|---|---|---|
| 0036821 | 9/1981 | European Pat. Off. | 376/446 |
| 0048343 | 3/1982 | European Pat. Off. | 376/446 |
| 0100389 | 9/1978 | Japan | 376/440 |
| 0012383 | 1/1984 | Japan | 376/440 |
| 1416333 | 12/1975 | United Kingdom | 376/440 |

*Primary Examiner*—Deborah L. Kyle
*Assistant Examiner*—Dan Wasil

[57] ABSTRACT

A fastener locking device for attaching the lower end of a guide thimble to the upper adapter plate of a fuel assembly bottom nozzle includes a connecting fastener and an annular locking sleeve. The fastener has an elongated body portion and an enlarged head portion, and is insertable from the bottom through a passageway of the bottom nozzle. The fastener body portion is externally-threaded for forming a threaded connection with an internally-threaded plug on the lower end of the guide thimble. Also, the fastener head portion has a cross-sectional size larger than that of the fastener body portion and of a small diameter upper passageway portion but smaller than that of a large diameter lower passageway portion for defining an annular gap therebetween and bottoming against an annular ledge which divides the upper and lower passageway portions. The fastener head portion also has a annular outwardly-opening groove defined therein. The annular locking sleeve has opposite upper and lower end segments. The sleeve upper end segment is insertable into the annular gap, and has a smaller cross-sectional size than that of the fastener head portion and an annular inwardly-extending lip thereon which fits into the annular groove when the sleeve is inserted into the gap. Also, the sleeve upper end segment contains a plurality of circumferentially spaced axially-extending slots which facilitates resilient circumferential expansion of the cross-sectional size thereof for fitting it snugly about and past the fastener head portion and into frictional engagement with a knurled exterior surface on the fastener head portion and for fitting the lip on the sleeve past the fastener head portion and into the groove. The other sleeve end segment has projections which mate with recesses defined in the lower passageway portion when the sleeve is inserted into the gap.

8 Claims, 6 Drawing Figures

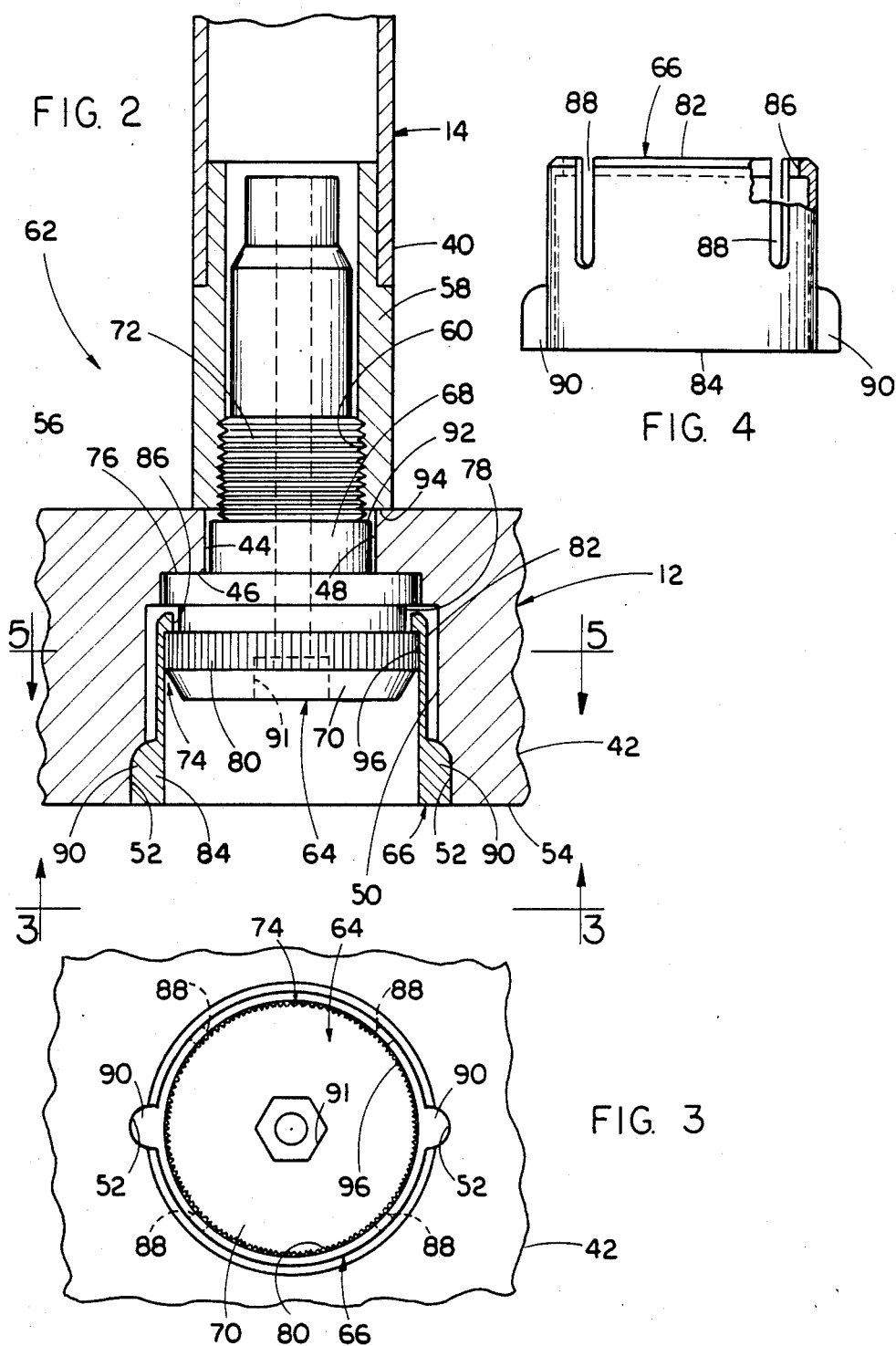

FASTENER LOCKING DEVICE FOR ATTACHING GUIDE THIMBLE TO FUEL ASSEMBLY BOTTOM NOZZLE

BACKGROUND OF THE INVENTION

1. Field of the Invention

The present invention relates generally to nuclear fuel assemblies and, more particularly, is concerned with an improved locking device for ensuring that a fastener which attaches a guide thimble to the bottom nozzle of the fuel assembly is maintained in its tightened position.

2. Description of the Prior Art

In most nuclear reactors, the reactor core is comprised of a large number of elongated fuel assemblies. Conventional designs of these fuel assemblies include a plurality of fuel rods held in an organized array by a plurality of grids spaced axially along the fuel assembly length and attached to a plurality of elongated control rod guide thimbles of the fuel assembly. Top and bottom nozzles on opposite ends of the fuel assembly are secured to the guide thimbles which extend slightly above and below the ends of the fuel rods.

The interconnected top and bottom nozzles and elongated guide thimbles which extend therebetween form the structural skeleton of the fuel assembly. For satisfactory reactor operation, the skeleton of each fuel assembly must exhibit a high degree of structural integrity for maintaining the grids and fuel rods supported thereon in precise alignment relative to the grids and fuel rods of other fuel assemblies within the reactor core. On the other hand, in view of the current demand for reconstitution of fuel assemblies, the skeleton must be capable of easy disassembly to repair and replace any failed components of the assembly. One recent practice is to make reconstitution possible by providing the fuel assembly with removable top and bottom nozzles, for example, as illustrated and described in U.S. Pat. No. 4,323,428 to Schallenberger et al which is assigned to the assignee of the present invention. Other arrangements of fuel assemblies which can be disassembled are illustrated and described in U.S. Pat. Nos. 3,828,868 and 4,208,248 to Jabsen.

In one conventional embodiment of an arrangement for releasably attaching the guide thimbles of the fuel assembly to its bottom nozzle, screws are used to interconnect and precisely position lower ends of the guide thimbles with and upon the upper central adapter plate of the bottom nozzle. Specifically, each screw is inserted from below the bottom nozzle upwardly through one of a number of passageways through its adapter plate. The outer externally threaded end of the screw is threaded into an internally threaded plug rigidly connected on the lower end of the guide thimble. The screw has an inner enlarged head which bottoms against a ledge defined in the adapter plate by an enlarged diameter portion of the passageway. The end of the screw head has an upstanding annular wall which extends contiguous with the enlarged portion of the passageway. Then, once the screw is torqued to its tightened position, opposite diametric portions of the annular wall on its head are bulged into cut outs or recesses in the enlarged passageway portion to prevent the screw from counterrotating and unloosening the rigid attachment of the guide thimble with the bottom nozzle.

Although this particular attachment arrangement provides a satisfactory interconnection between the guide thimbles and the bottom nozzle of the fuel assembly, the screw has proven difficult and expensive to fabricate and is frequently scrapped after one-time use due to cracks being formed therein by the bulging operation for anchoring the screw against counterrotation. Consequently, a need exists for improvement of the guide thimble attachment arrangement which retains the benefits provided by the use of a screw as in the previous arrangement but avoids the disadvantages accompanying the particular embodiment thereof. While a number of different arrangements for anchoring screws and bolts in general are known in the prior art, for example as illustrated and described in U.S. Pat. Nos. 2,782,827 and 2,886,090 to Rosan, 1,814,858 to Rutter and 3,160,188 to Frank, none are viewed as particularly adapted to provide the improvement being sought herein.

SUMMARY OF THE INVENTION

The present invention provides a fastener locking device designed to satisfy the aforementioned needs. The device of the present invention is composed of a two-piece fastener assembly which is used in place of the above-described prior one-piece screw. The device includes a connecting fastener and a locking sleeve. Like the prior screw, the connecting fastener also provides a rigid attachment of a given one of the guide thimbles to the bottom nozzle adapter plate. The locking sleeve then coacts with the connecting fastener and bottom nozzle to provide a positive locking of the fastener after it has been torqued to its desired tightened position. Now, the connecting fasteners can be reused, with only the locking sleeves, which are much smaller and less expensive items, needing to be replaced each time after the fasteners have been removed.

Accordingly, the present invention sets forth a fastener locking device for use in a nuclear reactor fuel assembly. The fuel assembly includes an end nozzle and at least one longitudinally-extending guide thimble projecting away from the end nozzle. The end nozzle has at least one passageway defined therethrough and a ledge defined within the passageway so as to face away from the guide thimble and divide the passageway into a first portion extending from the ledge toward the guide thimble and a second portion extending from the ledge away from the guide thimble, with the second passageway portion having a larger cross-sectional size than the first passageway portion. The end nozzle also has recess means defined thereon in the second portion of the passageway. The guide thimble has an end disposed adjacent to the first portion of the passageway with threaded means defined thereon.

The fastener locking device providing the improvement of the present invention comprises: (a) a connecting fastener; and (b) an annular locking sleeve. The connecting fastener has opposite end portions. One of the fastener end portions has threaded means defined thereon being complementary to and interengageable with the threaded means defined on the guide thimble end for making a threaded connection with the guide thimble end when the fastener is inserted through the passageway. The other of the fastener end portions has a cross-sectional size larger than that of the one fastener end portion and that of the first passageway portion but smaller than that of the second passageway portion for defining an annular gap therebetween and for bottoming against the ledge when the fastener is inserted through the passageway. The annular locking sleeve has opposite end segments. One of the sleeve end segments is insertable into the annular gap, has a smaller cross-sectional size than that of the other end portion of the fastener, and is circumferentially and resiliently flexible for allowing it to expand in cross-section and fit snugly about and past the other end portion of the fastener and into frictional engagement therewith when inserted into the gap. The other of the sleeve end segments has projecting means mated with the recess means defined in the second passageway portion when the one end segment of the sleeve is inserted into the gap.

More particularly, the other end portion of the fastener has a knurled exterior surface frictionally engaged with the one end segment of the sleeve when the fastener is inserted through the passageway and the sleeve is inserted into the gap. In one embodiment, the one end segment of the sleeve has a generally smooth inside surface which frictionally engages the knurled exterior surface of the other end portion of the fastener. In an alternative embodiment, the one end segment of the sleeve has a generally complementary knurled inside surface which frictionally interengages and mates with the knurled exterior surface of the other end portion of the fastener. Still further, the other end portion of the fastener has an annular outwardly-opening groove defined therein, and the one end segment of the sleeve has an annular inwardly-extending lip thereon which fits into the annular groove when the one end segment of the sleeve is inserted into the gap and fitted about and past the other end portion of the fastener. Furthermore, the one end segment of the sleeve contains a plurality of circumferentially spaced axially-extending slots which facilitate resilient circumferential expansion of the cross-sectional size of the end segment for fitting the lip on the sleeve past the other end portion of the fastener.

These and other advantages and attainments of the present invention will become apparent to those skilled in the art upon a reading of the following detailed description when taken in conjunction with the drawings wherein there is shown and described several illustrative embodiments of the invention.

BRIEF DESCRIPTION OF THE DRAWINGS

In the course of the following detailed description, reference will be made to the attached drawings in which:

FIG. 2 is an enlarged fragmentary view, in section, of the lower end of one guide thimble and a portion of the bottom nozzle of the fuel assembly of FIG. 1, showing the fastener locking device of the present invention, partly in section, by which the guide thimble is attached to the bottom nozzle.

FIG. 3 is a bottom plan view of the fastener locking device as seen along line 3—3 of FIG. 2.

FIG. 4 is a side elevational view of a locking sleeve of the fastener locking device being seen separated from the fastener of the device.

DETAILED DESCRIPTION OF THE INVENTION

Figure 1:
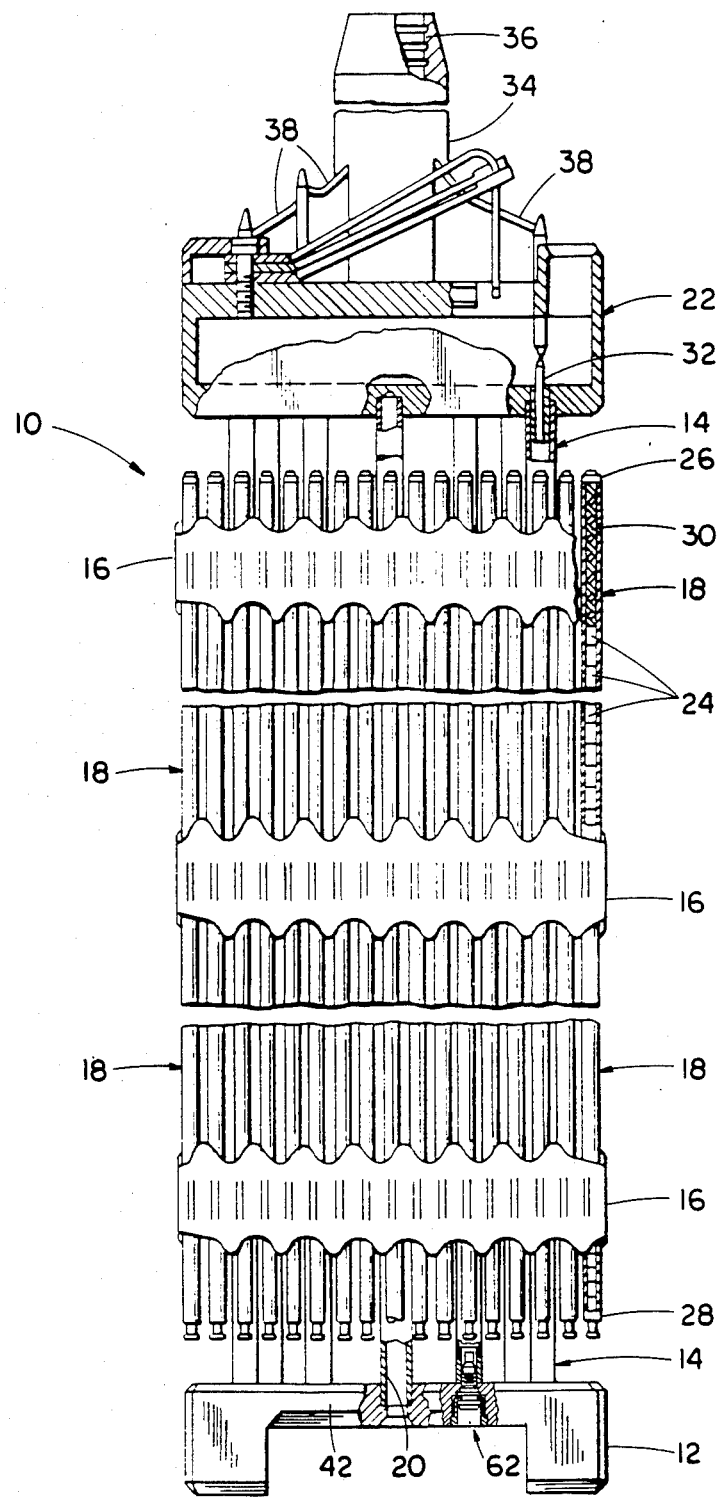
FIG. 1 is an elevational view, partly in section, of a fuel assembly which employs the fastener locking device of the present invention for attaching the guide thimbles to the bottom nozzle, the assembly being illustrated in vertically foreshortened form with parts broken away for clarity.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such arrangement of parts, the fuel assembly 10 forms an integral unit capable of being conveniently handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the PWR. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 has associated therewith a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Improved Attachment of Guide Thimbles to Bottom Nozzle

For making the fuel assembly 10 reconstitutable, as mentioned earlier it is conventional practice to releasably attach the lower ends 40 of the guide thimbles 14 to the upper central adapter plate 42 of the bottom nozzle 12. As known heretofore, the adapter plate 42 has a plurality of passageways 44 extending therethrough (only one passageway being seen in FIG. 2) which are matched in number and pattern to that of the guide thimbles 14. A downwardly-facing annular ledge 46 is defined on the adapter plate 42 within each passageway 44 so as to divide the passageway into upper and lower cylindrical portions 48,50 with the diameter of the lower portion 50 being greater than that of the upper portion 48. The adapter plate 42 of the bottom nozzle 12 also has pairs of recesses 52 defined thereon, with one recess pair being defined in the lower portion 50 of each passageway 44 and opening into the passageway and also at a lower surface 54 of the adapter plate. The lower end 40 of each guide thimble 14, which is disposed adjacent to an upper surface 56 of the adapter plate 42 and aligned with the upper portion 48 of one of the passageways 44 thereof, has a plug 58 attached thereon, such as by welding. The plug 58 is in the form of a hollow sleeve having an internally-threaded section 60 defined therein at its lower end.

To facilitate attachment of the lower end 40 of each guide thimble 14 to the adapter plate 42 of the bottom nozzle 12 in a reliable manner, the present invention provides a fastener locking device, being illustrated in FIGS. 2 to 5 and designated by the numeral 62. The fastener locking device 62 basically includes a connecting fastener 64 and an annular locking sleeve 66.

The connecting fastener 64 has an elongated body portion 68 and an enlarged head portion 70, and is insertable from below upwardly through one of the passageways 44 of the bottom nozzle 12. The fastener body portion 68 has an externally-threaded section 72 on its upper end for forming a threaded connection with the internally-threaded section 60 of the plug 58 on the lower end 40 of the guide thimble 14. Also, the fastener head portion 70 has a cross-sectional size larger than that of the fastener body portion 68 and of the small diameter upper passageway portion 48. But, the cross-sectional size of the fastener head portion 70 is smaller than that of a large diameter lower passageway portion 50 so as to define an annular space or gap 74 therebetween. Also, the fastener head portion 70 has an annular leading surface 76 thereon which bottoms against the annular ledge 46 of the adapter plate 42 which divides the upper and lower cylindrical passageway portions 48,50. Finally, the fastener head portion 70 has an annular outwardly-opening groove 78 defined therein and an annular straight knurled exterior surface 80 which is coextensive with the annular gap 74.

The annular locking sleeve 66 has opposite upper and lower end segments 82,84. The sleeve upper end segment 82 is insertable into the annular gap 74. Specifically, at its leading edge, the upper end segment 82 has an annular inwardly-extending lip 86 thereon of a slightly smaller cross-sectional size than that of the fastener head portion 70 which fits into the annular groove 78 when the upper end segment is inserted into the gap 74. Also, the upper end segment 82 contains a plurality of circumferentially spaced axially-extending slits or slots 88 which open at the leading edge of the segment and make it able to flex radially outward in relation to a central axis of the sleeve 66. The slots 88 thereby facilitate resilient circumferential expansion of the cross-sectional size of the sleeve upper end segment 82 for fitting it snugly about and past the fastener head portion 70 and into frictional engagement with the straight knurled exterior surface 80 on the fastener head portion and for fitting the lip 86 of the sleeve 66 past the fastener head portion and into the groove 78 therein. The lower end segment 84 of the locking sleeve 66 has a pair of projections 90 which mate with recesses 52 defined in the lower portion 50 of the adapter plate passageway 44 when the sleeve 66 is inserted into the gap 74.

For making the threaded connection with the guide thimble end plug 58, the fastener 64 is inserted through the passageway 44 and, by placing a suitable tool in hex opening 91 of the fastener head portion 70, rotatably screwed into the plug 58 until a leading ledge 76 on the fastener body portion 68 engages the annular ledge 46 of the adapter plate. Then the sleeve 66 is inserted into the gap 74 by guiding its projections 90 into the adapter plate recesses 52 and pressing its upper end segment 82 past the knurled exterior surface 80 on the fastener head portion 70 until the sleeve lip 86 snaps into the groove 78, at the position seen in FIG. 2. The projections 90 of the locking sleeve 66 by being seated within the adapter plate recesses 52 prevent rotation of the sleeve.

Figure 5:
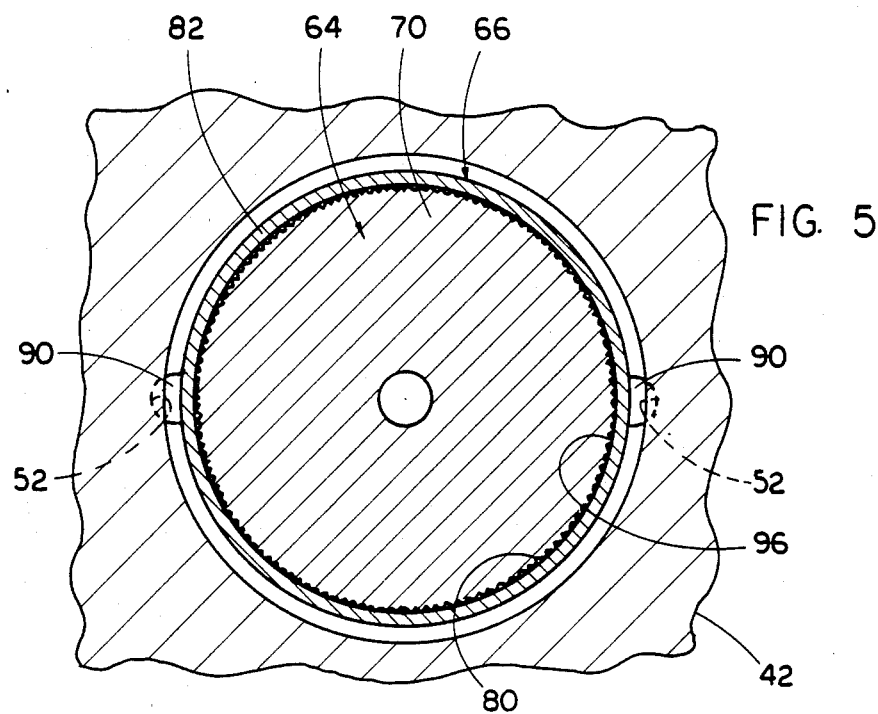
FIG. 5 is an enlarged fragmentary view of the locking device of FIG. 3, showing the frictional fit between the knurled exterior surface of the fastener head and the smooth inside surface of the locking sleeve.
Figure 6:
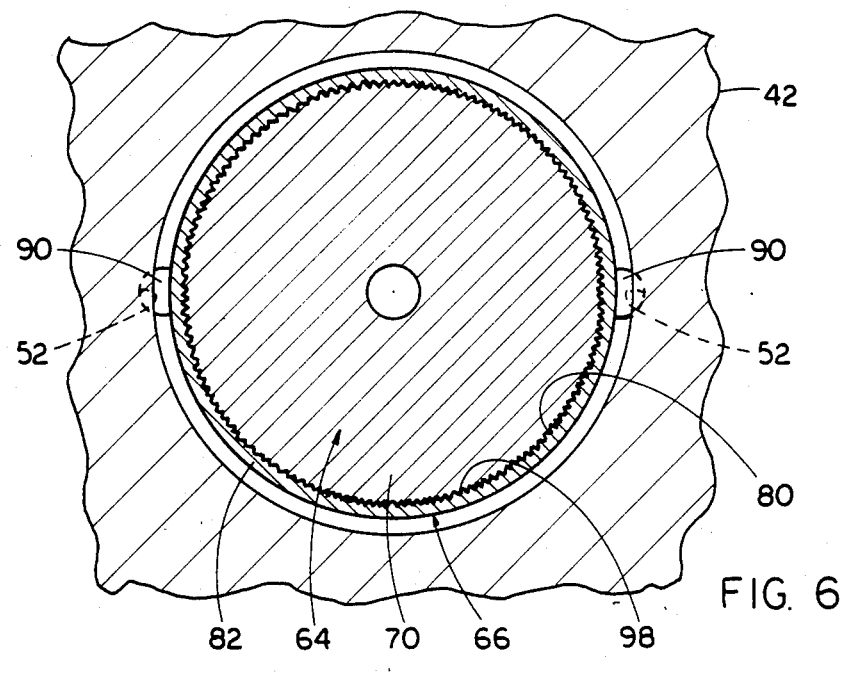
FIG. 6 is another enlarged fragmentary view similar to that of FIG. 5, but showing an alternative embodiment of the locking device sleeve which has a knurled inside surface that mates with the knurled exterior surface of the fastener head.

An inside surface 96 of the sleeve upper end segment 82 makes frictional engaging contact with the knurled exterior surface 80 on the fastener head portion 70 when the sleeve is inserted in the gap 74. As seen in FIG. 5, the inside surface 96 is generally smooth. However, it will ordinarily still achieve sufficient frictional engagement with the knurled exterior surface 80 of the fastener head portion 70 to prevent any axial or rotational movement of the sleeve 66 relative to the fastener 64. However, for added assurance, a spot weld could be made to rigidly connect the two parts of the device 62. Alternatively, in the embodiments of FIG. 6, the sleeve lower end segment 82 has a generally complementary straight knurled inside surface 98 which frictionally interengages and mates with the knurled exterior surface 80 of the fastener head portion 70 to provide greater positive assurance against counter-rotation of the fastener 64.

It is thought that the fastener locking device of the present invention and many of its attendant advantages will be understood from the foregoing description and it will be apparent that various changes may be made in the form, construction and arrangement thereof without departing from the spirit and scope of the invention or sacrificing all of its material advantages, the forms hereinbefore described being merely preferred or exemplary embodiments thereof.

What is claimed is:

1. In a nuclear reactor fuel assembly including an end nozzle and at least one longitudinally-extending guide thimble projecting away from said end nozzle, said end nozzle having at least one passageway defined therethrough and a ledge defined within said passageway so as to face away from said guide thimble and divide said passageway into a first portion extending from said ledge toward said guide thimble and a second portion extending from said ledge away from said guide thimble, said second passageway portion having a larger cross-sectional size than said first passageway portion, said end nozzle also having recess means defined thereon in said second portion of said passageway, said guide thimble having an end disposed adjacent to said first portion of said passageway with threaded means defined thereon, a fastener locking device comprising:

(a) a connecting fastener insertable through said passageway of said end nozzle, said fastener having opposite end portions, one of said end portions of said fastener having threaded means defined thereon being complementary to and interengageable with said threaded means defined on said guide thimble end for making a threaded connection with said guide thimble end when said fastener is inserted through said passageway, the other of said end portions of said fastener having a cross-sectional size larger than that of said one end portion of said fastener and that of said first passageway portion but smaller than that of said second passageway portion for defining on annular gap therebetween and for bottoming against said ledge when said fastener is inserted through said passageway; and (b) an annular locking sleeve having opposite end segments, one of said end segments of said sleeve being insertable into said annular gap, having a smaller cross-sectional size than that of said other end portion of said fastener, and being circumferentially and resiliently flexible for allowing it to expand in cross-section and fit snugly about and past said other end portion of said fastener and into frictional engagement therewith when inserted into said gap, the other of said end segments of said sleeve having projecting means mated with said recess means defined in said second passageway portion when said one end segment of said sleeve is inserted into said gap;

(c) said other end portion of said fastener having a knurled exterior surface frictionally engaged with said one end segment of said sleeve when said fastener is inserted through said passageway and said sleeve is inserted into said gap;

(d) said one end segment of said sleeve containing a plurality of circumferentially spaced axially-extending slots which facilitate resilient circumferential expansion of the cross-sectional size of said one end segment of said sleeve for allowing it to fit snugly about and past said other end portion of said fastener and into frictional engagement with said knurled exterior surface thereon when inserted into said gap.

2. The device as recited in claim 1, wherein said one end segment of said sleeve has a generally smooth inside surface frictionally engaged with said knurled exterior surface of said other end portion of said fastener when the latter is inserted through said passageway and said sleeve is inserted into said gap.

3. The device as recited in claim 1, wherein said one end segment of said sleeve has a generally complementary knurled inside surface frictionally interengaged and mated with said knurled exterior surface of said other end portion of said fastener when the latter is inserted through said passageway and said sleeve is inserted into said gap.

4. The device as recited in claim 1, wherein:
said other end portion of said fastener has an annular outwardly-opening groove defined therein; and
said one end segment of said sleeve has an annular inwardly-extending lip thereon which fits into said annular groove when said one end segment of said sleeve is inserted into said gap and fitted about and past said other end portion of said fastener.

5. The device as recited in claim 5, wherein said slots in said one end segment of said sleeve facilitate resilient circumferential expansion of the cross-sectional size of said one end segment for fitting said lip on said sleeve past said other end portion of said fastener.

6. In a nuclear reactor fuel assembly including a bottom nozzle and at least one longitudinally extending guide thimble projecting upwardly therefrom, said bottom nozzle having an adapter plate, at least one generally cylindrical passageway defined through said adapter plate and a downwardly-facing annular ledge defined on said adapter plate within said passageway so as to divide said passageway into upper and lower cylindrical portions with the diameter of said lower portion being greater than that of said upper portion, said adapter plate of said bottom nozzle also having recess means defined thereon in said lower portion of said passageway, said guide thimble having a lower end disposed adjacent to said upper portion of said passageway in said adapter plate and having a plug attached thereon with an internally-threaded section, a fastener locking device comprising:

(a) a connecting fastener insertable through said passageway of said bottom nozzle, said fastener having an elongated body portion and an enlarged head portion, said fastener body portion having an externally-threaded section defined thereon being complementary to and interengageable with said internally-threaded section of said plug on said guide thimble end and extending upwardly beyond said bottom nozzle toward said guide thimble for making a threaded connection with said plug on said guide thimble end when said fastener is inserted through said passageway, said fastener head portion having a cross-sectional size larger than that of said fastener body portion and that of said first passageway portion but smaller than that of said second passageway portion for defining an annular gap therebetween when said fastener is inserted through said passageway, said fastener head portion also having an annular outwardly-opening groove defined therein; and (b) an annular locking sleeve having opposite upper and lower end segments, said sleeve upper end segment being insertable into said annular gap, having a smaller cross-sectional size than that of said fastener head portion, having an annular inwardly-extending lip thereon which fits into said annular groove when said sleeve one end segment is inserted into said gap, and containing a plurality of circumferentially spaced axially-extending slots which facilitates resilient circumferential expansion of the cross-sectional size of said one end segment for fitting it snugly about and past said fastener head portion and into frictional engagement therewith and for fitting said lip on said sleeve past said fastener head portion and into said groove when said sleeve one end segment is inserted into said gap, the other of said end segments of said sleeve having projecting means mated with said recess means defined in said second passageway portion when said sleeve one end segment is inserted into said gap;

(c) said fastener head portion having a knurled exterior surface frictionally engaged with said other end segment of said sleeve when said fastener is inserted through said passageway and said sleeve is inserted into said gap.

7. The device as recited in claim 6, wherein said other end segment of said sleeve has a generally smooth inside surface frictionally engaged with said knurled exterior surface of said fastener head portion when the latter is inserted through said passageway and said sleeve is inserted into said gap.

8. The device as recited in claim 6, wherein said other end segment of said sleeve has a generally complementary knurled inside surface frictionally interengaged and mated with said knurled exterior surface of said fastener head portion when the latter is inserted through said passageway and said sleeve is inserted into said gap.

* * * * *